United States Patent
Fehrenbach et al.

(10) Patent No.: US 9,945,709 B2
(45) Date of Patent: Apr. 17, 2018

(54) DETERMINING A DISTANCE AND A FLOW SPEED OF A MEDIUM

(71) Applicant: VEGA Grieshaber KG, Wolfach (DE)

(72) Inventors: Josef Fehrenbach, Haslach (DE); Juergen Motzer, Gengenbach (DE); Daniel Schultheiss, Hornberg (DE)

(73) Assignee: VEGA GRIESHABER KG, Wolfach (DE)

( * ) Notice: Subject to any disclaimer, the term of this patent is extended or adjusted under 35 U.S.C. 154(b) by 315 days.

(21) Appl. No.: 14/325,017

(22) Filed: Jul. 7, 2014

(65) Prior Publication Data

US 2015/0007654 A1    Jan. 8, 2015

(30) Foreign Application Priority Data

Jul. 8, 2013 (DE) .......... 10 2013 213 340

(51) Int. Cl.
| | | |
|---|---|---|
| *G01F 23/28* | (2006.01) | |
| *G01S 13/88* | (2006.01) | |
| *G01S 13/58* | (2006.01) | |
| *G01S 7/03* | (2006.01) | |
| *G01S 7/35* | (2006.01) | |
| *G01F 1/00* | (2006.01) | |

(Continued)

(52) U.S. Cl.
CPC .............. *G01F 23/28* (2013.01); *G01P 5/00* (2013.01); *G01S 7/03* (2013.01); *G01S 13/343* (2013.01); *G01S 13/584* (2013.01); *G01S 13/88* (2013.01); *G01F 1/002* (2013.01); *G01F 1/663* (2013.01); *G01F 23/284* (2013.01); *G01S 7/35* (2013.01)

(58) Field of Classification Search
CPC .......... G01F 1/002; G01F 1/663; G01F 1/667; G01F 1/66; G01F 23/28; G01F 23/284; G01F 23/2845; G01P 5/242; G01S 13/583; G01S 13/584; G01S 13/87; G01S 13/88

See application file for complete search history.

(56) References Cited

U.S. PATENT DOCUMENTS 5,315,880 A * 5/1994 Bailey .................. G01F 1/002
                                                    324/642
5,420,591 A   5/1995 Annee et al.
(Continued)

FOREIGN PATENT DOCUMENTS

| CN | 1442674 | 9/2003 |
|---|---|---|
| CN | 1662793 | 8/2005 |

(Continued)

OTHER PUBLICATIONS

English Language Machine Translation of DE 3223393, 2 pgs. obtained online at <http://worldwide.espacenet.com/ > on Apr. 3, 2016.*

(Continued)

*Primary Examiner* — Harshad R Patel
*Assistant Examiner* — Punam Roy
(74) *Attorney, Agent, or Firm* — Fay Kaplun & Marcin, LLP

(57) ABSTRACT

A fill level measurement device is specified for determining distance of the measurement device and flow speed of a medium, which comprises a frequency-modulated transmission signal having a rising and a falling frequency ramp. The flow speed of the medium can be determined by the Doppler effect arising from the flow speed of the medium.

4 Claims, 3 Drawing Sheets

(51) Int. Cl.
   *G01F 1/66*      (2006.01)
   *G01F 23/284*    (2006.01)
   *G01P 5/00*      (2006.01)
   *G01S 13/34*     (2006.01)

(56) References Cited

U.S. PATENT DOCUMENTS

| | | | | |
|---|---|---|---|---|
| 5,675,259 | A * | 10/1997 | Arndt | G01F 1/66 |
| | | | | 324/642 |
| 5,684,250 | A * | 11/1997 | Marsh | G01F 1/002 |
| | | | | 702/100 |
| 5,751,240 | A * | 5/1998 | Fujita | G01S 13/34 |
| | | | | 342/107 |
| 5,796,679 | A | 8/1998 | Yankielun | |
| 5,811,688 | A | 9/1998 | Marsh et al. | |
| 5,815,112 | A * | 9/1998 | Sasaki | G01S 13/87 |
| | | | | 342/113 |
| 6,184,819 | B1 * | 2/2001 | Adomat | G01S 13/48 |
| | | | | 342/107 |
| 6,317,073 | B1 * | 11/2001 | Tamatsu | G01S 7/352 |
| | | | | 342/109 |
| 6,650,280 | B2 * | 11/2003 | Arndt | G01F 23/284 |
| | | | | 342/124 |
| 7,228,728 | B2 | 6/2007 | Ouriev et al. | |
| 7,571,656 | B2 | 8/2009 | Derevyagin et al. | |
| 7,672,797 | B2 | 3/2010 | Petroff | |
| 7,721,600 | B1 * | 5/2010 | Sinclair | G01F 1/002 |
| | | | | 73/290 R |
| 7,729,201 | B2 * | 6/2010 | Wildey | G01F 1/66 |
| | | | | 367/101 |
| 7,861,600 | B2 | 1/2011 | Mayer et al. | |
| 8,184,039 | B2 * | 5/2012 | Garrod | G01F 1/002 |
| | | | | 342/124 |
| 8,881,603 | B2 * | 11/2014 | Ueberschlag | G01F 1/667 |
| | | | | 73/861.25 |
| 9,151,650 | B2 * | 10/2015 | Tsao | G01P 5/00 |
| 2003/0185101 | A1 | 10/2003 | Wildey | |
| 2006/0109169 | A1 * | 5/2006 | Winter | G01S 13/345 |
| | | | | 342/70 |
| 2007/0165488 | A1 * | 7/2007 | Wildey | G01F 1/66 |
| | | | | 367/101 |
| 2008/0143583 | A1 | 6/2008 | Welle | |
| 2009/0251360 | A1 | 10/2009 | Uebo | |
| 2009/0309785 | A1 | 12/2009 | Nalezinski et al. | |
| 2010/0031753 | A1 | 2/2010 | Mayer et al. | |
| 2010/0060512 | A1 * | 3/2010 | Garrod | G01F 1/002 |
| | | | | 342/124 |
| 2010/0257930 | A1 * | 10/2010 | Isenmann | G01F 15/063 |
| | | | | 73/273 |
| 2011/0211644 | A1 | 9/2011 | Larocque | |
| 2012/0079890 | A1 * | 4/2012 | Ueberschlag | G01F 1/667 |
| | | | | 73/861.27 |
| 2012/0130509 | A1 | 5/2012 | Altendorf et al. | |
| 2012/0169528 | A1 | 7/2012 | Edvardsson | |
| 2013/0000416 | A1 * | 1/2013 | Croft | G01F 1/002 |
| | | | | 73/861.18 |
| 2013/0041600 | A1 | 2/2013 | Rick | |
| 2014/0085132 | A1 | 3/2014 | Jirskog | |
| 2014/0340259 | A1 * | 11/2014 | Fehrenbach | G01S 13/02 |
| | | | | 342/359 |
| 2015/0007654 | A1 * | 1/2015 | Fehrenbach | G01P 5/00 |
| | | | | 73/198 |
| 2015/0007655 | A1 * | 1/2015 | Skowaisa | G01S 13/34 |
| | | | | 73/198 |
| 2015/0015431 | A1 | 1/2015 | Trotta | |
| 2015/0033844 | A1 | 2/2015 | Chen | |
| 2015/0035695 | A1 | 2/2015 | Lin | |
| 2015/0153447 | A1 | 6/2015 | Lee et al. | |
| 2015/0323660 | A1 | 11/2015 | Hampikian | |
| 2016/0139264 | A1 | 5/2016 | Larocque | |

FOREIGN PATENT DOCUMENTS

| | | |
|---|---|---|
| CN | 1926409 | 3/2007 |
| CN | 101907472 | 12/2010 |
| CN | 202304908 | 7/2012 |
| DE | 30 47 690 | 7/1982 |
| DE | 32 23 393 | 12/1983 |
| DE | 101 49 851 | 4/2003 |
| DE | 10 2008 036963 | 2/2010 |
| DE | 10 2010 044182 | 6/2012 |
| DE | 10 2012 011165 | 12/2013 |
| EP | 1431724 | 6/2006 |
| EP | 2388614 | 11/2011 |
| GB | 2376740 | 12/2002 |
| GB | 2350004 | 11/2011 |
| JP | H102779 | 1/1998 |
| JP | 3 012 522 | 2/2000 |
| JP | 2011 064677 | 3/2011 |

OTHER PUBLICATIONS

**** Nalezinski, "FMCW—Radarsensoren bei 24 Ghz in planarem Aufbau zur Fullstandsmessung", Dissertation Universitat der Bundeswehr Munchen, Munchen, Germany, 2003, pp. 6-8.
**** Ruser, "Ultraschall-Mikrowellen-Sensorsystem und Geschwindigkeits—und Abstandsmessungmit diversitar-redundanter Auswertung der Phasensignale", Oct. 2003, pp. 25-31 and 71-74.
Williams 3$^{rd}$ et al., "Technology of Water Flow Measurement Represented by Thirty Years of CMTC", IEEE, 2008, 8 sheets.

* cited by examiner

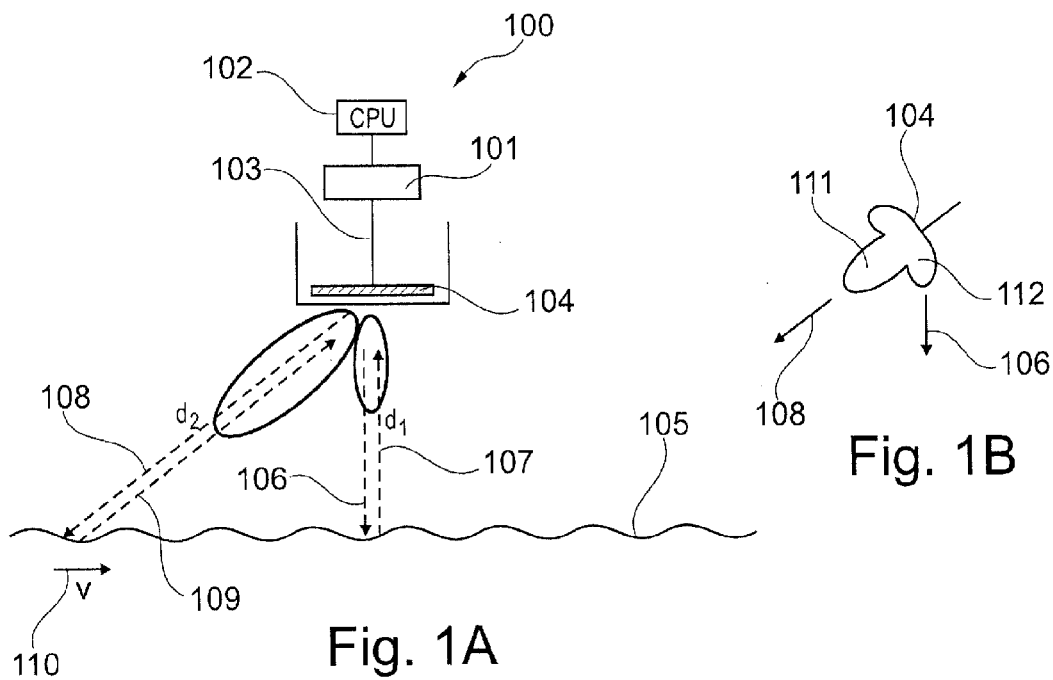
Fig. 1A
Fig. 1B
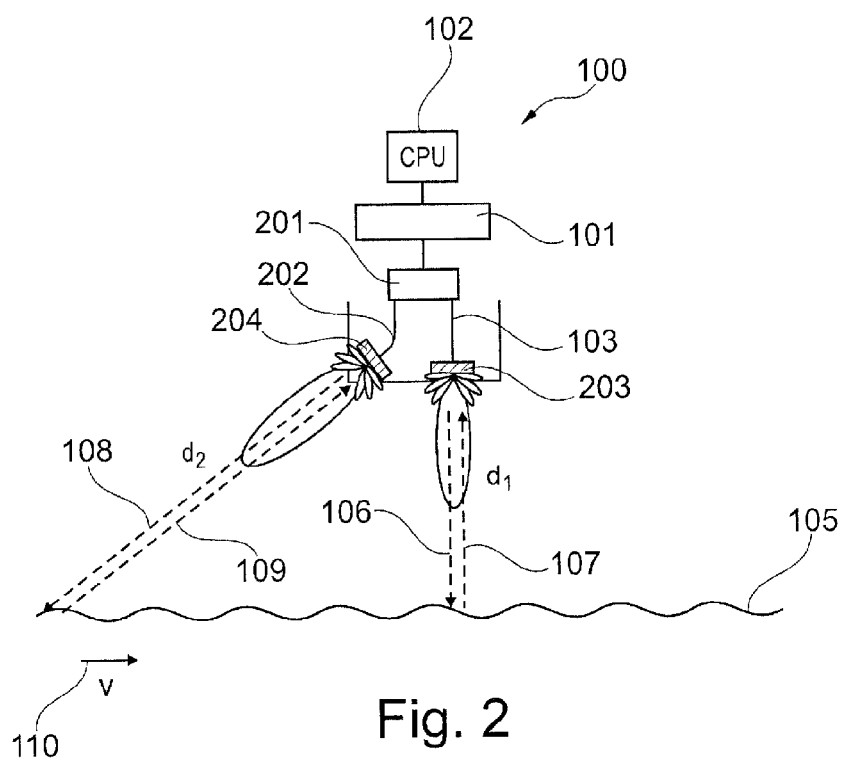
Fig. 2

DETERMINING A DISTANCE AND A FLOW SPEED OF A MEDIUM

REFERENCE TO RELATED APPLICATIONS

This application claims the benefit of the filing date of German Patent Application No. 10 2013 213 340.5 filed on 8 Jul. 2013, the disclosure of which is hereby incorporated herein by reference.

FIELD OF THE INVENTION

The invention relates to determining the distance between a fluid (medium) and a sensor and to determining the flow speed of the medium. In particular, the invention relates to a measurement device for determining a distance from a medium and a flow speed of the medium by evaluating a frequency-modulated transmission signal emitted by the measurement device and reflected by the medium. In addition, the invention relates to a method for determining a distance from a medium and a flow speed of the medium, to a program element and to a computer-readable medium.

BACKGROUND

Measurement devices for determining the distance between the sensor and a medium and the flow speed of said medium are known which consist of two different measurement systems for detecting the distance (measurement system 1) and the flow speed (measurement system 2). These measurement devices can be used to measure the level of flowing water.

The distance is detected by way of a pulsed radar. By contrast, the flow speed is determined by Doppler evaluation of a constant transmission signal, which is for example a continuous wave (CW) signal.

SUMMARY OF THE INVENTION

A first aspect of the invention relates to a measurement device, for example a fill level measurement device, for determining a distance of the measurement device from a medium and a flow speed of the medium by evaluating a frequency-modulated transmission signal emitted by the measurement device and reflected by the medium. The measuring device comprises an FMCW module for generating a frequency-modulated transmission signal which has a rising and a falling frequency ramp. In addition, an antenna arrangement is provided which is used to emit the transmission signal in a first direction perpendicular to the flow direction of the medium. Further, the measurement device comprises a processor unit for determining the distance from the medium and the flow speed of the medium by evaluating the transmission signal reflected by the medium and received by the antenna arrangement.

The FMCW transmission signal has at least two frequency ramps, one being a rising ramp and the other being a falling ramp. When evaluating the reflected transmission signal, this leads to a positive shift in the measured distance from a reflector or (for the other frequency ramp) to a negative shift in the distance. This is thus a "triangular modulation" of the transmission signal.

In an embodiment of the invention, the processor unit is configured to determine the distance from the medium and the flow speed of the medium within a single measurement cycle.

It should be noted that in all the embodiments of the invention, it may be provided that the transmission signal is generated by the same signal generator module irrespective of whether it is emitted perpendicular to the flow direction of the medium and/or obliquely to the flow direction of the medium. In particular, it may also be provided that the received, reflected transmission signals are evaluated by the same processor unit. The distance can be determined from the transmission signal emitted in the first direction after it has been reflected on the surface of the filling medium and the flow speed of the medium can be determined from the transmission signal emitted in the second direction.

The flow speed and the distance of the fill level measurement device from the medium can be determined by a single measurement in which the transmission signal is emitted in the first direction perpendicular to the flow direction of the medium and, before this, after this or simultaneously, is emitted in the second direction obliquely to the flow direction of the medium.

The transmission signal is accordingly initially emitted in two different directions, followed by an evaluation of the corresponding signals reflected on the surface of the filling medium, which signals make it possible to determine the flow speed and the distance (i.e. the fill level or level).

In addition to the simultaneous emission of the transmission signal in the two different directions, it is also possible to initially emit the transmission signal in the first direction and subsequently in the second direction (or vice versa).

Distance and flow speed can be determined sequentially or in parallel, depending on the embodiment of the fill level measurement device.

It may also be provided that the measurement cycle is defined as follows. The distance is measured repeatedly by transmission signals which are in succession over time being emitted in the first direction and the correspondingly reflected signals being evaluated. The transmission signal emitted obliquely to the flow direction of the medium is, however, evaluated less often, for example only after each tenth or twentieth measurement of the distance. This may mean that the transmission signal is also only emitted in the second direction if a certain number of distance measurements has taken place or if a certain amount of time has elapsed since the last determination of flow speed (for example one minute).

It is, however, also possible for the transmission signal to be emitted more often in the second direction, and for the corresponding reflected signal, which is received from this direction by the antenna arrangement, to however only also be evaluated (to determine the flow speed) if a certain number of fill level measurements has taken place or if a certain amount of time has elapsed since the last determination of flow speed (for example one or two minutes).

It may accordingly be provided that the determination of the flow speed is triggered by a certain event. In this context, as already described, said event may be a certain number of distance measurements being carried out and/or a certain amount of time elapsing since the last determination of flow speed. Alternatively or additionally, the event triggering the determination of flow speed may also be constituted by the level (that is to say the "distance") having changed by more than a predetermined threshold value over a predetermined period of time. In other words, in this embodiment, a measurement of flow speed is triggered if the distance changes sufficiently rapidly.

In a further embodiment of the invention, the antenna arrangement is configured to emit the transmission signal in the first direction perpendicular to the flow direction of the medium and in a second direction different from the first direction.

The antenna arrangement may comprise a single antenna having two or more primary radiation directions. For example, the antenna arrangement may be an array of a plurality of planar antennas.

The antenna arrangement may also comprise a first antenna and a second antenna, the first antenna being configured to emit the transmission signal in the first direction and the second antenna being configured to emit the transmission signal in the second direction.

These antennas may be operated simultaneously or alternately. In other words, in the first case, the transmission signal is emitted in both directions simultaneously, and in the second case, in which the antennas are operated alternately, the transmission signal is firstly emitted in the first direction and then in the second direction.

The emitted transmission signal is reflected at least in part on the surface of the medium and thus is radiated back to the antenna at least in part, which receives the reflected, radiated back transmission signal and passes said signal to a signal processing unit.

In a further embodiment of the invention, the two antennas are connected to the FMCW module via a single directional coupler, a single power splitter or a switch.

A directional coupler, a power splitter or a switch may be positioned in the HF signal path between the HF module (FMCW module) and the antenna arrangement.

In a further embodiment of the invention, the processor unit is configured to determine the flow speed of the medium by evaluating the width of the transmission signal reflected by the medium and received by the antenna arrangement after it has undergone a Fourier transform into the frequency range.

If the transmission signal is emitted merely perpendicular to the flow direction of the medium, a widening of the IF signal transformed by a fast Fourier transform is produced which is dependent on the flow speed.

In a further embodiment of the invention, the measurement device is configured as a fill level radar.

It may also be provided that the antenna arrangement can be rotated with respect to a housing region of the measurement device, which region is provided for fixing the measurement device on a support, in such a way that the antenna arrangement can be orientated optimally with respect to the flow direction of the water without the measurement device itself having to be orientated for this purpose.

In particular, the measurement device may be configured for connection to a 4-20 mA two-wire line, via which it is supplied with power for the measurement operation and can simultaneously transmit a measurement value which is proportional to the flowing current.

A further aspect of the invention provides a method for determining a distance of a measurement device from a medium and a flow speed of the medium by evaluating a frequency-modulated transmission signal emitted from a measurement device and reflected by the medium. First, a frequency-modulated transmission signal is generated, which has a rising and a falling frequency ramp. The transmission signal is then emitted in a first direction perpendicular to the flow direction of the medium, and the distance from the medium and the flow speed of the medium are determined by evaluating the transmission signal reflected by the medium and received by the antenna arrangement.

In principle, it may also be provided that the transmission signal is not emitted perpendicular to the flow direction of the medium, but in a direction oblique to the flow direction of the medium. If the emitting angle is known, in this case the distance from the surface of the medium can also be determined.

A further aspect of the invention provides a program element which, when executed on a processor unit of a fill level measurement device, causes the fill level measurement device to carry out the method steps described above and below.

A further aspect of the invention provides a computer-readable medium on which a program element is stored which, when executed on a processor unit of a fill level measurement device, causes the fill level measurement device to carry out the method steps described above and below.

In the following, embodiments of the invention will be described with reference to the figures.

BRIEF DESCRIPTION OF THE DRAWINGS

FIG. 1A shows a measurement device in accordance with an embodiment of the invention.

FIG. 1B shows the transmission lobe of a transmission signal in accordance with an embodiment of the invention.

FIG. 2 shows a measurement device in accordance with a further embodiment of the invention.

DETAILED DESCRIPTION OF EMBODIMENTS

Figure 3:
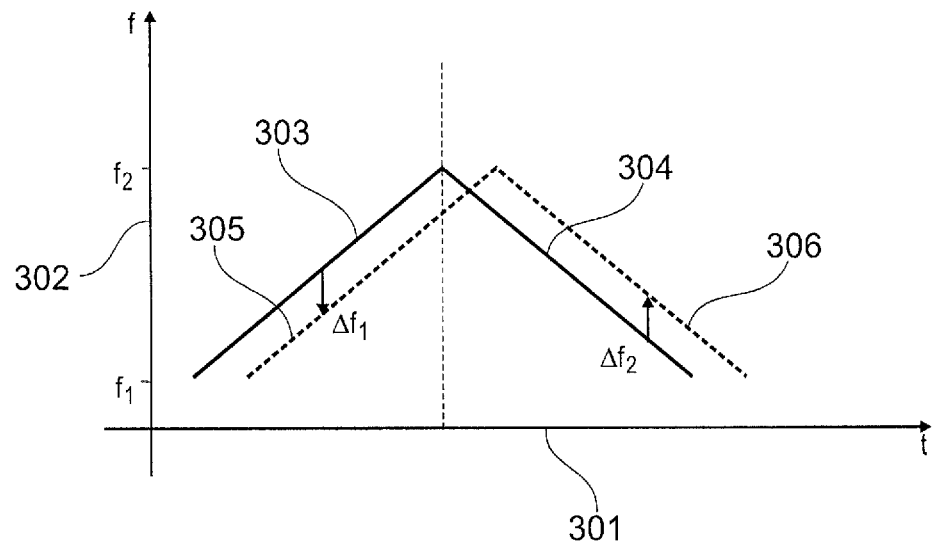
FIG. 3 shows a measurement signal and a received signal.

The figures of the drawings are schematic and not to scale.

Where like reference numerals are used in the following description of the figures, they denote like or similar elements. However, like or similar elements may also be denoted by different reference numerals.

FIG. 1A shows a measurement device 100 in accordance with an embodiment of the invention. The measurement device comprises a processor unit 102, which is connected to an FMCW module 101. A signal line 103 leads from the FMCW module 101 to an antenna arrangement 104, which is for example a planar antenna, for example in the form of an antenna array.

The antenna arrangement 104 emits the transmission signal in a direction 106 perpendicular to the flow direction 110 of the medium 105. The signal is reflected at least in part on the surface of the medium 105 and is sent back to the antenna arrangement 104 in the opposite direction 107.

However, the antenna arrangement 104 also emits the transmission signal in a direction 108 which is different from the direction 106 and for example is at an angle α to the flow direction 110 which is between 0 degrees and 90 degrees, for example between 30 degrees and 60 degrees and is for example approximately 45 degrees. The transmission signal emitted in direction 108 is also reflected at least in part on the surface of the medium 105 and is sent back to the antenna arrangement 104 again in the opposite direction 109.

FIG. 1B shows the intensity distribution of the transmission signal emitted by the antenna arrangement depending on the radiation direction in accordance with an embodiment of the invention. The transmission signal is emitted by the antenna arrangement 104 and has a primary direction 108, as represented by the primary lobe 111. Two secondary lobes 112 are provided, one of which emits in direction 106.

According to the invention, the distance between the sensor 100 and the surface of the medium (that is to say the fill level) and the flow speed, and optionally also the flow direction of the medium, are determined. The flow throughput can also be calculated when the channel shape is known if the dimensions of the flow bed are known.

The measurement device can for example be an FMCW radar sensor, which comprises an HF module 101 and one or two antennas. From the present transmission signal, which is received by the antenna arrangement after it has been reflected on the surface of the medium (a fluid), the distance of the sensor from the medium and the flow speed or flow direction thereof can be determined.

The distance and the flow speed are evaluated by the FMCW sensor using a rising and a falling frequency ramp and by evaluating the Doppler effect, which is caused by the flow movement of the medium. To measure the Doppler effect, it may be advantageous for the surface of the medium to have rippling or a wave formation.

The measurement device may be configured as a two-line sensor (e.g. 4-20 mA loop-powered). Levels, flow speeds and flow directions of water can thus be effectively measured in a simple manner.

A score concept of the invention can be considered that it is possible for the distance from the surface of a medium and the flow speed and direction of the medium to be determined simultaneously by means of an FMCW radar sensor. When the channel shape in which the medium flows, is known, the flow throughput can also be calculated.

FIG. 2 shows an embodiment of a measurement device 100 which, by contrast with the measurement device in FIG. 1, comprises two antennas 203, 204. The first antenna 203 emits the transmission signal in direction 106 perpendicular to the flow direction 110 of the medium 105 and is connected to the FMCW module 101 via the signal line 103 and a directional coupler, a switch or a power splitter 201. The second antenna 204 is at an angle α to the first antenna, so that the transmission signal is emitted in direction 108. The second antenna 204 is connected to the directional coupler, the power splitter or the switch 201 via the signal line 202 and via said coupler, splitter or switch to the FMCW module 101.

If an FMCW module is used together with two antennas or one antenna having two different primary radiation directions, the distance from the medium and the flow speed thereof can be evaluated in a measurement cycle.

To determine the distance and the flow speed or flow direction, two frequency ramps need to be passed through in accordance with generally known FMCW radar methods. The first ramp 303 is for example increasing in frequency, starting at the frequency f1 and ending at the frequency f2. Subsequently, the falling second ramp 304 starts at f2 and ends at the frequency f1 (cf. FIG. 3). The horizontal axis 301 denotes the time t and the vertical axis 302 denotes the frequency f of the transmission signal.

The curve 305, 306, which is displaced to the right, reproduces the received signal received by the antenna arrangement (that is to say the transmission signal reflected by the surface of the medium).

The signals generated in this case are sampled from the two ramps using an analogue-digital converter and transformed into the frequency range in a microprocessor using a fast Fourier transform (FFT).

Figure 4:
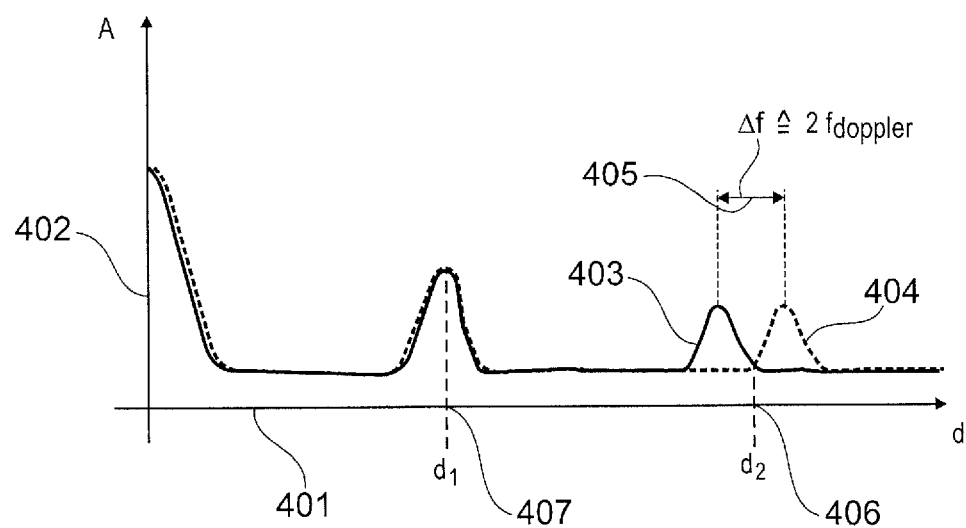
FIG. 4 shows FFT-transformed signals at the receiver output of ramp 1 and ramp 2.

This results in two spectra, which are shown in FIG. 4.

In this context, the horizontal axis 401 denotes the distance d between the sensor and the corresponding reflector, and the vertical axis 402 denotes the amplitude of the received signal.

The first echo 407 which corresponds to the shortest distance between the sensor and the surface of the medium specifies the distance d1 from the medium; from the echo 406 that is further away, the speed of the medium and the flow direction thereof can be determined.

The reflection from the distance measurement gives the same difference frequency between the transmitted and received signals for both ramps.

The reflection from the obliquely incident signal, which was emitted in direction 108 (cf. FIGS. 1 and 2), is used to determine the flow speed and is shifted in frequency by $f_{Doppler}$ as a result of the Doppler effect. This results in different difference frequencies in the rising and falling ramps. These differ by $2 \times f_{Doppler}$, as can be seen at the peaks 403, 404. One peak 403, which is shifted to the left with respect to the actual distance $d_2$, results from the received signal of the rising frequency ramp 303 (cf. FIG. 3), and the peak signal 404 shifted to the right results from the received signal of the falling frequency ramp 306.

The arrow 405 represents the frequency difference ☐f between the two peaks, which is twice the Doppler shift.

The rising and falling flanks of the triangular modulation have a different Doppler shift direction. Signal processing takes place for example only after a brief pause after the inflection points of the transmitted frequency modulation. This is what is known as triangular modulation. The use of a triangular modulation shape provides the possibility of detecting the Doppler frequency as a measure of a radial speed as an independent measurement value aside from the distance measurement. The receiving frequency increases during approach and thus decreases the value of the difference frequency during the rising frequency ramp. As a result of the superposition with the Doppler frequency, the frequency difference when measuring an approach in the rising flank of the triangular modulation is smaller. In the falling flank it is larger by the same amount than for a stationary reflector.

For the opposite flow direction (in other words away from the sensor), the receiving frequency decreases and thus increases the difference frequency during the rising frequency ramp. Equivalently, the difference frequency decreases in the falling ramp. If the gradient of the frequency change is equal in size in the rising and falling flanks of the triangular signal, the average of the difference frequencies from the two measurement periods is a measure of distance, independent of the speed. The sum of the difference frequencies is a measure of the half radial speed of the object.

By evaluating the direction of the frequency shift for the increasing and the falling frequency ramp, the flow direction can additionally be determined. In general, there are high requirements on the linearity of the frequency change.

If there are additional echoes in the region behind the echo 407 for the distance measurement other than the echoes for the flow speed measurement, for example additional echoes owing to interference reflections by objects or by multiple media surfaces, the expected distance range for determining the flow speed can be calculated from the known angle α between the two antenna radiation directions 106, 108 and the distance of the measurement device from the medium.

Figure 5:
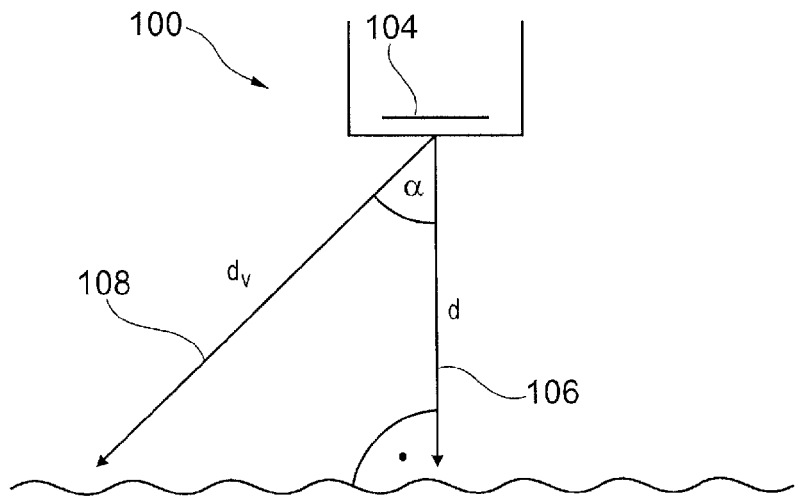
FIG. 5 shows a measurement device in accordance with an embodiment of the invention.

The range above and below this distance can be set as a measurement window 603 in which the two echoes are evaluated from a rising and a falling frequency ramp. Relatively high measurement reliability can thus be achieved when determining the flow speed (cf. FIGS. 5 and 6).

Figure 6:
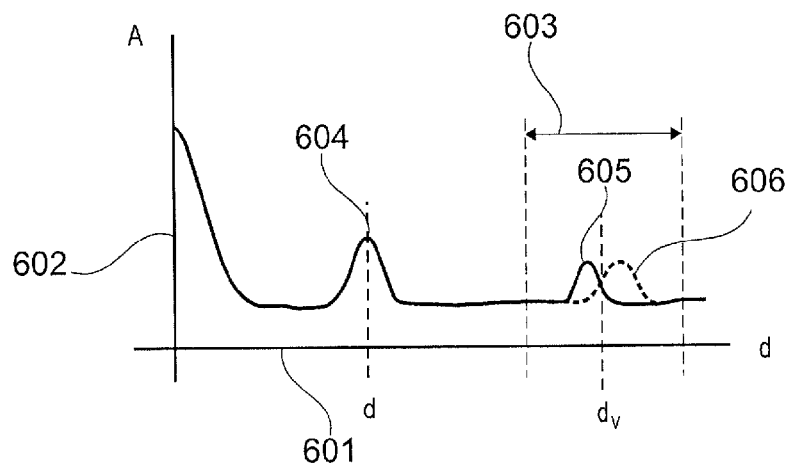
FIG. 6 shows a further FFT-transformed signal at the receiver output of the measurement device.

In FIG. 6, as previously in FIG. 4, the distance d 601 is plotted against the amplitude 602 of the received signal (reflected transmission signal) after it has undergone a Fourier transform. In this case too, the main peak 604, which corresponds to the distance between the sensor and the surface of the medium, and the two peaks 605, 606, which originate from the obliquely emitted transmission signal, can be seen. These two peaks are inside the measurement window 603.

However, the flow speed of the medium may also be determined in another way. In particular if only one antenna having a single primary radiation direction is used, the flow speed can also be measured directly in the reflected signal. In this context, only the echo can be taken into account at the distance d from the surface of the medium.

Since an antenna also always emits and receives portions outside the primary radiation direction, and the sensor thus also measures obliquely with respect to the surface of the medium, signals which are affected by the Doppler frequency due to the movement of the medium are also always present at a receiver of the FMCW radar module.

Figure 7:
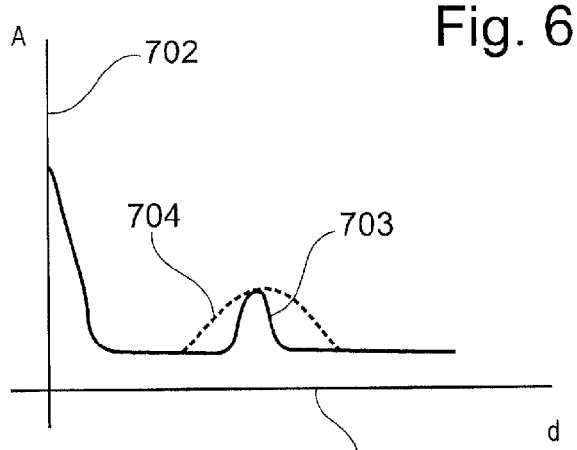
FIG. 7 shows a further FFT-transformed signal at the receiver output of a measurement device.

As a result, the IF signal (intermediate-frequency signal) transformed by FFT has a widening dependent on the flow speed, as is indicated by the peaks 703 and 704 of FIG. 7. As in FIGS. 4 and 6, the horizontal axis 701 denotes the distance and the vertical axis 702 denotes the amplitude. The narrower peak 703 corresponds to a lower flow speed of the medium and the wider peak 704 corresponds to a higher flow speed of the medium.

The flow speed can be determined from this widening. A small widening means a low speed and a large widening means a high speed.

The measurement device may have a corresponding calibration, in such a way that the flow speed can be determined sufficiently precisely by measuring the widening.

If two antennas are used, as is shown in FIG. 2, the flow speed and optionally also the flow direction can be determined using the antenna 204 by the aforementioned method. In a second measurement sequence, likewise using the FMCW method, the fill level can be determined using the antenna 203.

The two values can subsequently be outputted or used to calculate the flow throughput by the measurement device.

Figure 8:
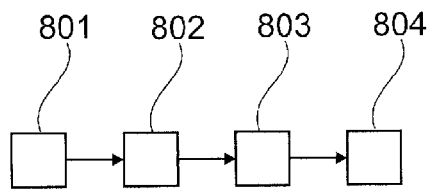
FIG. 8 is a flow chart of a method in accordance with an embodiment of the invention.

FIG. 8 is a flow chart of a method in accordance with an embodiment of the invention.

In step 801, a frequency-modulated transmission signal is generated, which has a rising and a falling frequency ramp. To increase the accuracy, a plurality of such frequency ramps can be provided in succession.

In step 802, the transmission signal is then emitted at least in a first direction perpendicular to the flow direction of the medium, or in another direction. In step 803, the transmission signal reflected on the surface of the medium is detected by the antenna arrangement, and in step 804, a processor unit determines the distance of the sensor from the medium and the flow speed thereof by evaluating the transmission signal reflected by the medium and received by the antenna arrangement.

For the sake of completeness, it should be noted that "comprising" and "having" do not exclude the possibility of other elements or steps, and "an" or "a" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. A method, comprising:
    generating a frequency-modulated transmission signal, which has a rising and a falling frequency ramp;
    emitting the frequency-modulated transmission signal in a first direction perpendicular to a flow direction of a medium and in a second direction different from the first direction;
    determining a distance from the medium by evaluating the frequency-modulated transmission signal reflected by the medium and received by the antenna arrangement; and
    determining a flow speed of the medium by evaluating the transmission signal reflected by the medium and received by the antenna arrangement when the distance to the medium has changed by a predetermined threshold value over a predetermined period of time.

2. A non-transitory computer-readable medium on which a program element is stored which, when executed on a processor of a fill level measurement device, causes the fill level measurement device to carry out the steps according to claim 1.

3. The method of claim 1, further comprising:
    determining the flow throughput of the medium.

4. The method of claim 1, further comprising:
    determining the flow speed of the medium when a predetermined number of distance measurements have been carried out.

* * * * *